United States Patent [19]

Kanda

[11] Patent Number: 4,800,445

[45] Date of Patent: Jan. 24, 1989

[54] VIDEODISK PLAYER

[75] Inventor: Masao Kanda, Saitama, Japan

[73] Assignee: Pioneer Electronic Corporation, Tokyo, Japan

[21] Appl. No.: 833,703

[22] Filed: Feb. 27, 1986

[30] Foreign Application Priority Data

Feb. 28, 1985 [JP] Japan .............................. 60-29372[U]

[51] Int. Cl.⁴ .............................................. H04N 5/76
[52] U.S. Cl. ..................................... 358/342; 358/312
[58] Field of Search ............... 358/342, 907, 312, 313; 369/47, 43; 360/10.1, 11.1, 35.1, 78

[56] References Cited

U.S. PATENT DOCUMENTS

| | | | |
|---|---|---|---|
| 4,403,259 | 9/1983 | Masaki | 358/342 |
| 4,429,335 | 1/1984 | Sugiyama et al. | 360/10.1 X |
| 4,519,004 | 5/1985 | Wilkinson et al. | 358/342 |

*Primary Examiner*—W. B. Perkey
*Attorney, Agent, or Firm*—Sughrue, Mion, Zinn, Macpeak & Seas

[57] ABSTRACT

A control and reading circuit for a videodisk player, wherein a pulse is generated in synchronization with the rotation of the disk. A subsequent synchronizing signal initiates digitized storage of the playback signal. After storage of sufficient data, the pick up mechanism of a disk detector is caused to jump one or more tracks in a direction dictated by the mode of operation.

10 Claims, 4 Drawing Sheets

VIDEODISK PLAYER

BACKGROUND OF THE INVENTION

The present invention relates to a videodisk player for playing not only a constant angular velocity (CAV) disk whose rotational angular velocity is constant but also a constant linear velocity (CLV) disk whose rotational linear velocity is constant.

There are two types of videodisks. The first type is the CAV disk on which are stored video signals having a fixed number of fields (for instance, two or four fields) per track. The disk is rotated at a given fixed angular velocity. The second type of disk is the CLV disk on which the number of fields per track increases as the diameter increases. For instance, there are typically two fields on the innermost track but about six fields on the outermost track. A CLV disk is rotated at a variable angular velocity so as to produce a given fixed linear tracking velocity.

In the case of the CAV disk, the time base servo will be substantially free from disturbance even if the pickup is made to jump because the vertical synchronizing signals are arranged along a given radial line. Therefore, it is relatively easy to use a CAV disk for both normal playback and also special playback, such as slow, still and fast playback. On the hand, for a CLV disk, the time base servo will be disturbed to a large extent if the pickup is made to jump because the vertical synchronizing signals are not located on a given radial line of the CLV disk, and this results in relative difficulty in accomplishing special playback effects such as slow, still and fast playback. Special operations such as slow, still and fast playback for a CLV disk are possible, however, using techniques such as disclosed in Japanese Laid-Open Pat. Appln. No. 58-98881.

Although such a conventional disk player is capable of providing color images with a stable time base servo, there is a drawback in that the reproduced images are uncomfortable to look at as the vertical synchronizing signals are discontinuous.

SUMMARY OF THE INVENTION

Accordingly, an object of the invention is to improve the synchronization for a constant linear velocity disk.

In accordance with the present invention, a playback signal from a disk is stored in a memory on the basis of a pulse that is synchronous with the rotation of the disk. A pickup is made to jump at least one track after the signal is stored in the memory.

DESCRIPTION OF THE PREFERRED EMBODIMENTS

Figure 1:
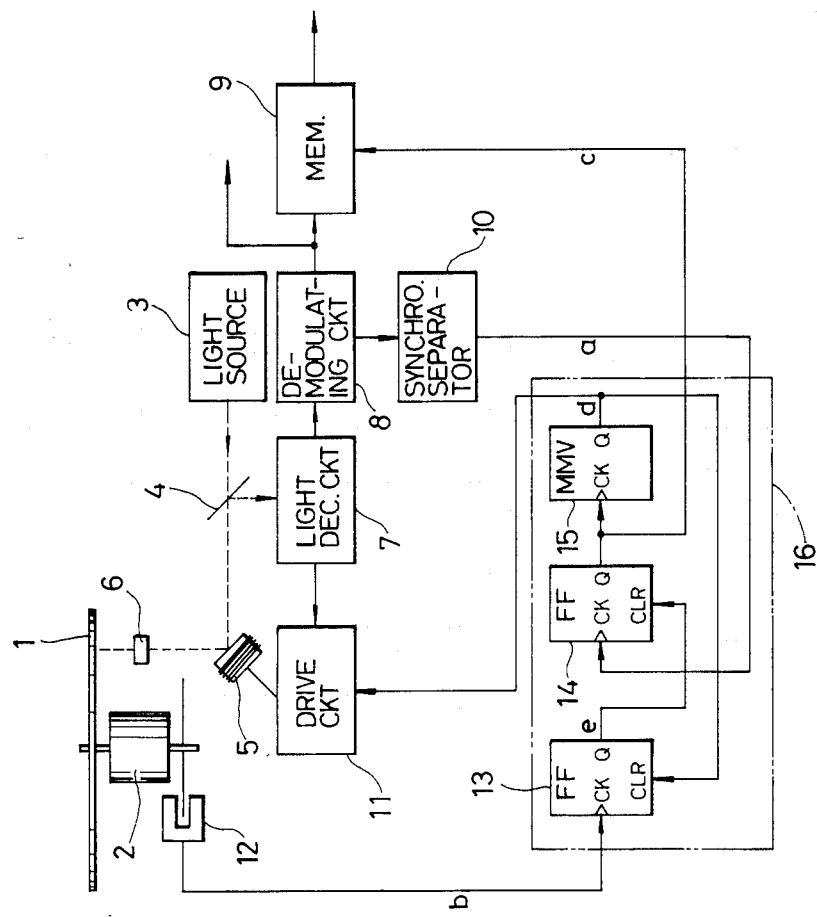
FIG. 1 is a block diagram of a videodisk player embodying the present invention.

FIG. 1 is a block diagram of a videodisk player embodying the present invention. A videodisk 1 stores video signals and is turned by a motor 2. A light source 3, such as a semiconductor laser, emits a laser beam that is incident on the disk 1 after passing through a beam splitter 4, a tracking mirror 5 and an objective lens 6. The beam reflected from the disk 1 is returned through the objective lens 6, the tracking mirror 5 and the beam splitter 4 to a light detecting circuit 7 that includes a light detecting element. The light source 3, the beam splitter 4, the tracking mirror 5, the objective lens 6 and the light detecting circuit 7 are included in a pickup.

The videodisk player further includes a demodulating circuit 8 for demodulating the signal produced by the liht detecting circuit 7. The output of the demodulating circuit 8 is applied both to a memory 9 and to a synchronizing separator circuit 10 which detects and separates the synchronzing signal. The videodisk player also includes a driving circuit 11 for driving the tracking mirror 5, and a rotational pulse generating circuit 12 for generating, for example, one rotational pulse per rotation of the disk 1. The pulse is generated synchronously with the rotation of the disk 1. First and second flip-flops 13 and 14, and a monostable multivibrator 15 constitute a circuit 16 for generating a control signal for controlling the driving circuit 11 and the memory 9.

Figure 2:
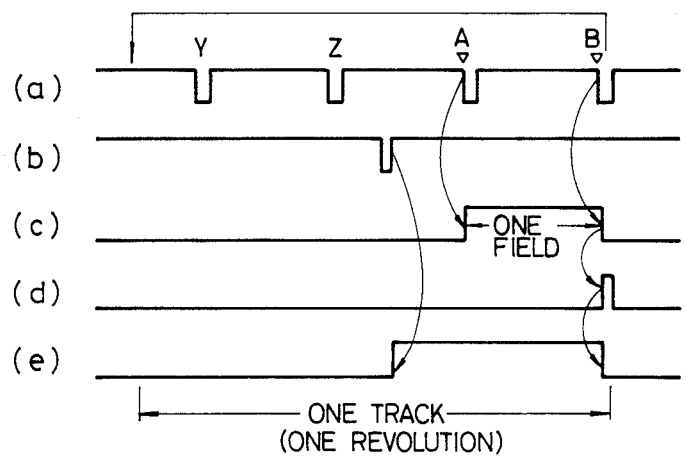
FIG. 2 is a timing chart for the videodisk player of the FIG. 1.

The operation of the videodisk player of FIG. 1 will be described with reference to FIGS. 2 and 3. The laser beam emitted from the light source 3 falls upon the disk 1 after passing the beam splitter 4, the tracking mirror 5 and the objective lens 6. The beam reflected from the disk 1 is returned to the light detecting circuit 7, including the light detecting element, through the objective lens 6, the tracking mirror 5 and the beam splitter 4. The playback signal includes the video signal stored on the disk 1 and can be obtained from the light detecting circuit 7.

The playback signal is demodulated by the demodulating circuit 8 and is supplied to the memory 9 and the synchronizing separator circuit 10. The successive data of the playback signal is stored in addressed locations in the memory 9 after being digitized. The stored signals, after being converted to analog form, are supplied to the CRT in response to address signals applied to the memory 9. The synchronizing separator circuit 10 separates the synchronizing signal from the remainder of the playback signal. Moreover, the tracking error signal generated by the lightdetecting circuit 7 is supplied to the driving circuit 11 to control the tracking mirror 5 so that the laser beam (pickup) follows a desired track. The demodulation signal from the demodulating circuit 8 is normally supplied during the playback operation to a cathode-ray tube (not shown), whereby a normal playback image is obtained.

Taking the still operation mode as an example, a special playback operation will be described. It is assumed that instructions as to the still operation are given. When the pickup (including the laser beam) is located on CLV disk at a position where the video signal has more than two fields but less than five fields per track (i.e., per turn or revolution) for instance, the pickup will be triggered (FIG. 2B) by a pulse b generated by the rotational pulse generating circuit 12, which causes the first flip-flop 13 to change from a low level signal e to a high level signal (FIG. 2E). Consequently, the clear input of the second flip flop 14 is released and the flip flop 14 is thereafter triggered (FIG. 2A) by the signal a, which is produced later than the level change of the signal e. That is, the signal a is produced by the synchronizing separator circuit 10 at the time it first detects the vertical synchronizing signal. Thereby the low level signal c at the output Q of the second flip flop 14 will be raised (FIG. 2C) so that it is at a high level at the occurrence of the first synchronizing signal a following the rotational pulse b. When the vertical synchronizing signal for the subsequent field is detected by the synchronizing separator circuit 10, the second flip-flop 14 will be triggered in response to the detecting signal a, and the high level output signal c will be changed to a low level. The memory 9 stores the successive values of the demodulated video signal received from the demodulating circuit 8 over the period of one field, while the signal c remains at the high level, and, in a separate operation, applies the signals stored therein to the CRT or similar device.

When the high level of the signal c changes to the low level, the monostable multivibrator 15 will be triggered and caused to output (FIG. 2D) a pulse d having a given width. On receiving the pulse d, the driving circuit 11 drives the tracking mirror 5 and causes the pickup to jump back by one track in the inward direction. As a result, the same track is rescanned for still reproduction. The pulse d is also be applied to the clear terminal of the first flip-flop 13, clearing the flip-flop 13 to set its output signal e to the low level. Consequently, the output signal c of the second flip-flop 14 will not change when the flip-flop 14 is triggered by the output a of the synchronizing separator circuit 10, but will remain at the low level.

When the disk 1 has made a complete revolution and the rotational pulse generating circuit 12 produces another pulse b, the same operations as described above will be repeated.

If the memory 9 has a capacity of one frame (two fields) of video data, the binary signal obtained from the output of the synchronizing separator circuit 10 may be used to trigger the second flip-flop 14. Use of a memory 9 having a capacity of one frame instead of one field will allow the production of an image of superior quality when a videodisk storing a signal having four fields per revolution is played.

Figure 3:
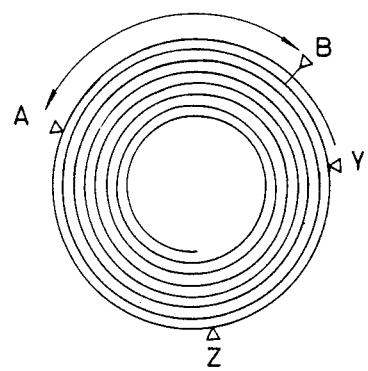
FIG. 3 is a typical elevational view of a videodisk.

As shown in FIG. 3 by a bold continuous line, the pickup will jump to the next inner track at the position of the vertical synchronizing signal B. The time base error is high for a certain period following a jump, a time interval of about several to 10 ms is needed until the color signal is locked. However, as the memory 9 is capable of storing the video signal of the field just prior to the jump (between the vertical synchronizing signals A and B), there will exist a time margin equivalent to at least one field (about 16.6 ms), even if still reproduction is conducted on the innermost track (where the video signal which has been subjected to complete color locking). Accordingly, time base correction is not required for the video signal stored in the memory 9 having one field. Therefore, a clear and still image can be obtained upon outputting this signal.

In the above-described embodiment, the vertical synchronizing signal is used as a trigger to control the memory 9 and the driving circuit 11. However, it is possible to implement the present invention without using a vertical synchronizing signal as a trigger signal. Such an embodiment of the present invention will now be described.

Figure 4:
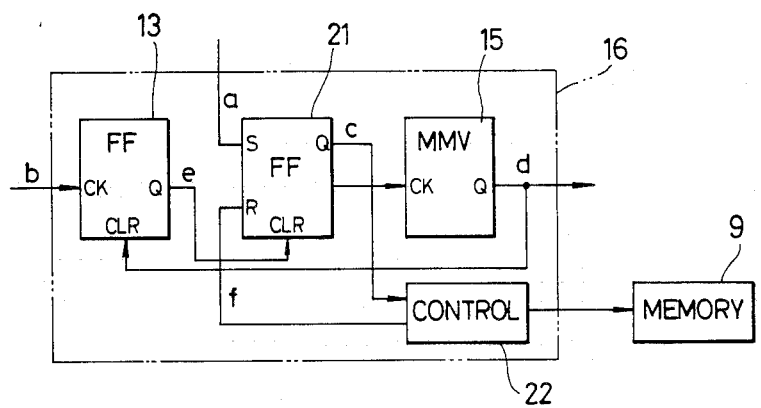
FIG. 4 is a block diagram of another embodiment of the videodisk player of the present invention.

FIG. 4 illustrates another embodiment of the present invention, wherein an RS flip-flop 21 replaces the T-type second flip flop 14 used as the generator circuit 16 of FIG. 1. It further includes a control circuit 22 for controlling writing and reading operations for the memory 9.

The pulse b is produced (FIG. 5B) by the rotational pulse generating circuit 12. The output signal e (FIG. 5E) of the first flip flop 13 is thereby caused to have a high level. When the clear input of the second flip-flop 21 is released, this second flip flop 21 will be set by the detecting signal a (FIG. 5A) from the synchronizing separator circuit 10, and its output signal c (FIG. 5C) will then be at a high level. On receiving the high-level signal c from the second flip-flop 14, the control circuit 22 applies a write signal to the memory 9 and makes the memory 9 store the analog playback signal from the demodulating circuit 8 in the form of a digital signal. The capacity of the memory 9, as a rule, corresponds to one field or less than one field, for instance, when the playback signal is combined with another signal for outputting. In the latter case, if the pickup is kept waiting for the output of the subsequent detecting signal a, the time required before the commencement of the following write operation after the jump will be shortened. Accordingly, the control circuit 22 will produce a signal f (FIG. 5F) when the data is written to the memory 9. The completion of the writing operation of data to the memory 9 can readily be detected by monitoring its address.

Figure 5:
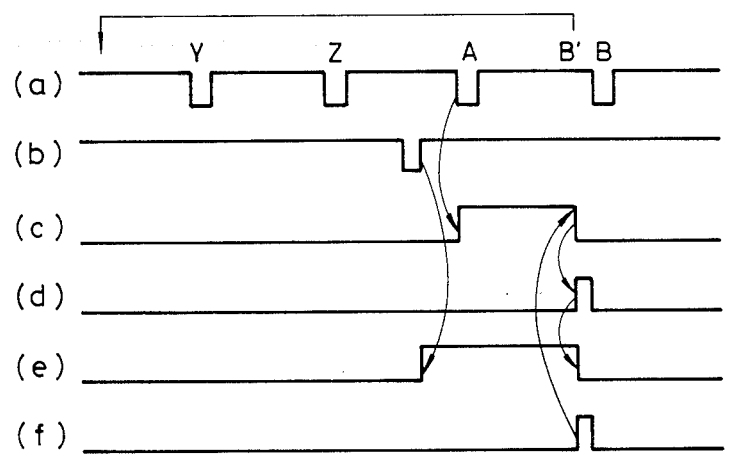
FIG. 5 is a timing chart for the videodisk player of FIG. 4.

When the control circuit generates the signal f to reset the second flip-flop 21, the output signal c of the second flip-flop 21 changes to the low level. The monostable multivibrator 15, triggered by the signal c, produces the pulse signal d (FIG. 5D). The pulse signal d clears the first flip-flop 13 and is also supplied to the driving circuit 11, thus causing the pickup to jump at the point B'. The control circuit 22 sends read signal pulse to the memory 9 until the subsequent write operation is conducted, and accordingly the memory 9 outputs the stored digital signal in sequence. When a vertical synchronizing signal is included in the data read from the memory 9, the synchronizing signal is prevented from appearing on the CRT screen by properly selecting the address at which reading is started.

Figure 6:
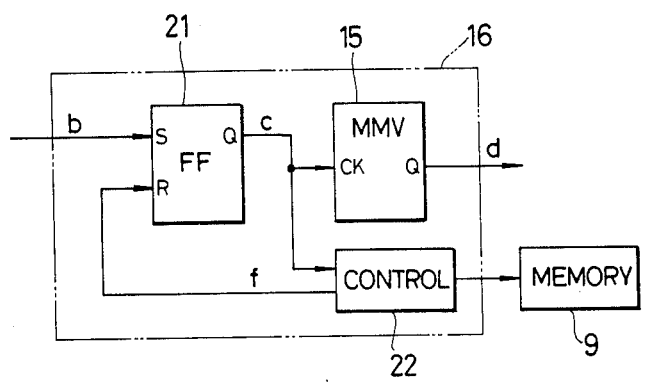
FIG. 6 is a block diagram of still another embodiment of the videodisk player of the present invention.
Figure 7:
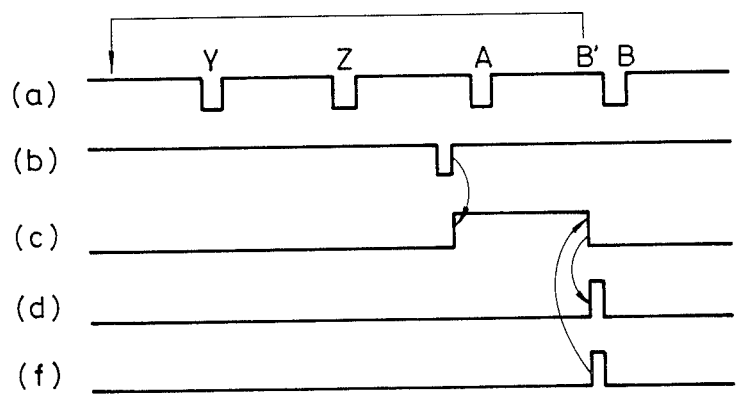
FIG. 7 is a timing chart for the player of FIG. 6.

FIG. 6 illustrates a case where both the time at which the pickup jumps and the time of commencement of the operation of writing data to the memory 9 are not synchronized with the vertical synchronizing signal. In this embodiment, the flip-flop 13 of FIG. 4 is omitted and the flip-flop 21 (the sole flip-flop) is arranged as to be reset directly by the pulse b (FIG. 7B) from the pulse generating circuit 12. As is seen from the timing diagram of FIG. 7, the subsequent operation is the same as that of FIG. 4 and hence a further detailed description thereof will be omitted.

After the pulse from the rotational pulse generating circuit 12 is enabled to ensure that rotation of the CLV disk is detectable and other such necessary other operations performed, it is possible to freely set when the memory 9 is allowed to start and stop storing data with the pulse as a basis for timing. Importance should be attached to jump performance quickly after completion of data storage in the memory 9 so that the video signal may be stored in such a state that the time base error is sufficiently stable.

Description has mainly been given of still playback. However, the present invention is obviously applicable to special playback such as slow and fast playback. Although the timing of the angular pulse b is fixed wtih respect to the rotation of the disk in the above-described embodiments, it is possible to provide frame-feed playback by forwarding or delaying the rotation by a time equivalent to one field (16.6 ms), for instance. Moreover, the playback direction in that case can be reversed by making the pickup jump to the outside or the forward or inside of the track.

As set forth above, according to the present invention, a circuit generates a rotational pulse synchronous with the rotation of the disk. A memory stores the video signals played back and detected. A driver selectively causes the pickup to jump at least one track. A control circuit produces a first control signal for controlling the driver on receiving the output of the rotational pulse generating circuit and a second control signal for controlling the memory. The driver is driven by means of the first control signal to make the pickup jump, and the memory is controlled by means of the second control signal so that the video signal just prior to the jump is stored in the control circuit, whereby the time required until the data is stored in the memory after the jump can be maximized and clear images are produced for special CLV disk-replaying operations such as still, slow, fast and frame-feed playback.

I claim:

1. A controller for a videodisk player for playing back video signals through a pickup from a disk rotating at a constant linear velocity, said controller comprising:
   a first circuit for generating a rotational pulse synchronous with the rotation of said disk;
   memory means responsive to an enabling signal for storing the video signals played back;
   driving means responsive to a jump signal for causing said pickup to execute a jump of at least one track; and
   control circuit means responsive to at least said rotational pulse for generating said enabling signal, for thereafter terminating said enabling signal upon completion of storage in said memory means of desired data derived from the played back video signal, and for generating said jump signal in response to the termination of said enabling signal.

2. The controller as recited in claim 1, further comprising means for deriving vertical synchronizing signals from said played back video signal, and wherein said control circuit means is responsive to both said rotational pulse and said vertical synchronizing signal for generating said enabling signal.

3. The controller as recited in claim 2, wherein said control circuit generates said enabling signal in response to the first vertical synchronizing signal occurring after said rotation pulse.

4. The controller as recited in claim 2, wherein said control circuit generates said enabling signal in response to a first vertical synchronizing signal and terminates said enabling signal in response to a second vertical synchronizing signal.

5. The controller as recited in claim 4, wherein said second vertical synchronizing signal is the next vertical synchronizing signal occurring after said first vertical synchronizing signal.

6. The controller as recited in claim 1, further comprising means for monitoring the storage of said data in said memory and for generating a completion signal upon said completion of storage of desired data in said memory, said control circuit being responsive to said completion signal for terminating said enabling signal.

7. The controller as recited in claim 2, further comprising means for monitoring the storage of said data in said memory and for generating a completion signal upon said completion of storage of desired data in said memory, said control circuit being responsive to said completion signal for terminating said enabling signal.

8. The controller as recited in claim 1, wherein said control circuit generates said enabling signal in response to said rotational pulse independently of any synchronizing signals in said played back video signal.

9. The controller as recited in claim 8, wherein said control circuit terminates said enabling signal independently of any synchronizing signals in said played back video signal.

10. The controller as recited in claim 1, wherein said control circuit terminates said enabling signal independently of any synchronizing signals in said played back video signal.

* * * * *